United States Patent [19]

Sarma et al.

[11] 4,321,246

[45] Mar. 23, 1982

[54] POLYCRYSTALLINE SILICON PRODUCTION

[75] Inventors: Kalluri R. Sarma; M. John Rice, Jr., both of Tempe; I. Arnold Lesk, Phoenix; Roger G. Nikirk, Tempe, all of Ariz.

[73] Assignee: Motorola, Inc., Schaumburg, Ill.

[21] Appl. No.: 148,093

[22] Filed: May 9, 1980

[51] Int. Cl.³ .................. C01B 33/02; C01B 33/107
[52] U.S. Cl. .................................. 423/350; 204/164; 423/342; 423/DIG. 10; 427/39; 427/86
[58] Field of Search ....... 423/342, 349, 350, DIG. 10; 204/164; 427/86, 39

[56] References Cited

U.S. PATENT DOCUMENTS

| | | | |
|---|---|---|---|
| 3,840,750 | 10/1974 | Davis et al. | 204/164 X |
| 3,933,985 | 1/1976 | Rodgers | 423/342 X |
| 4,102,985 | 7/1978 | Harvey | 423/350 |
| 4,170,667 | 10/1979 | Rodgers | 423/350 |

FOREIGN PATENT DOCUMENTS 838378 6/1960 United Kingdom ............... 204/164

*Primary Examiner*—Jack Cooper
*Attorney, Agent, or Firm*—John A. Fisher

[57] ABSTRACT

Polycrystalline silicon is produced by a high pressure plasma process. A silicon halide or halosilane is reacted with hydrogen in the presence of a high pressure plasma to deposit silicon on a heated substrate. The effluent from this reaction is collected, the silicon-bearing compounds separated out, and re-introduced to the deposition reaction. The initial silicon bearing compound can be inexpensive silicon tetrachloride. Maximum utilization of all silicon bearing reaction products maximizes polycrystalline silicon production efficiency.

8 Claims, 5 Drawing Figures

POLYCRYSTALLINE SILICON PRODUCTION

RELATED APPLICATIONS

This application is related to the inventions disclosed and claimed in concurrently filed, copending assigned applications entitled High Pressure Plasma Hydrogenation of Silicon Tetrachloride Ser. No. 184,094 and High Pressure Plasma Deposition of Silicon Ser. No. 184,095.

BACKGROUND OF THE INVENTION

This invention relates in general to a process for the production of polycrystalline silicon and more particularly to a balanced, cyclic high pressure plasma system for the efficient production of polycrystalline silicon.

Polycrystalline silicon, used by the semiconductor industry in the production of transistors, integrated circuits, photovoltaic cells, and the like, is presently produced by the hydrogen reduction of trichlorosilane. Silicon is deposited from the silicon-bearing trichlorosilane according to the reversible reaction

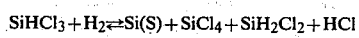

$$SiHCl_3 + H_2 \rightleftarrows Si(S) + SiCl_4 + SiH_2Cl_2 + HCl$$

The reaction is carried out at an elevated temperature by mixing the gases and bringing them into contact with a heated filament deposition surface. The effluent from the reaction is a mixture of gases including unreacted $SiHCl_3$ and $H_2$ and the reaction products $SiCl_4$, $SiH_2Cl_2$ and HCl. The effluent gas mixture is separated into individual gas components by condensation, adsorption and fractional distillation techniques to recover $SiHCl_3$ and $H_2$ which are recycled through the reactor after adding makeup $SiHCl_3$ and $H_2$. The other byproducts of the reaction are not used further for silicon deposition.

Trichlorosilane is an expensive starting material. Only one-third of the reacted trichlorosilane results in the deposition of silicon; the remaining trichlorosilane is converted to low-value waste products which have little utility as silicon deposition sources. The present process is thus expensive and inefficient because of low utilization of expensive reactants.

The present process is also very energy inefficient. Large quantities of energy are expended to heat the filament to the deposition temperature. The reaction is typically carried out in a relatively uninsulated reaction chamber to insure that the walls to the reactor are maintained at a temperature well below the deposition temperature. This minimizes deposition of silicon on the reactor walls and thus enhances reactor lifetime, but results in the waste of large quantities of energy. The reaction itself is also very inefficient, partly because the filament presents a small reaction surface area.

The process of reclaiming and separating useful gases from the effluent gas mixture also consumes time and energy. Large capital investment is necessary for the reclamation equipment.

The production of polycrystalline silicon is the starting point for all silicon semiconductor devices. The cost of the polycrystalline silicon therefore influences the cost of all silicon devices. The cost is especially significant for large area devices such as silicon photovoltaic cells. Accordingly, in order to reduce the cost of semiconductor devices and especially to reduce the cost of photovoltaic devices so that they can be competitive with other energy sources it is necessary to provide efficient and cost-effective methods for the production of polycrystalline silicon.

It is therefore an object of this invention to provide a method for the production of polycrystalline silicon characterized by a high utilization of input reactants.

It is a further object of this invention to provide a cyclic method for the production of polycrystalline silicon which efficiently utilizes byproducts of the silicon-producing reaction.

It is a still further object of this invention to provide a highly energy efficient method for the production of polycrystalline silicon which utilizes a high pressure plasma reaction.

It is another object of this invention to provide a high pressure plasma method for producing polycrystalline silicon and for recycling by-products from the silicon producing reaction.

SUMMARY OF THE INVENTION

The foregoing objects are achieved in the present invention through the use of a balanced and cyclic system for the production of polycrystalline silicon. In one embodiment of the invention, hydrogen and a silicon-bearing compound are reacted in the presence of a high pressure plasma to deposit silicon on a heated substrate. The effluent from the silicon deposition reaction is separated into silicon-bearing compounds, hydrogen and other byproducts. The silicon-bearing compounds and hydrogen along with makeup quantities of each reactant are re-introduced into the reactor to deposit additional silicon in a cyclic high pressure plasma reaction.

BRIEF DESCRIPTION OF THE DRAWINGS

The particular elements of the invention and the benefits to be derived therefrom will be more readily apparent after review of the following more detailed description of the invention taken in connection with the drawings in which.

DETAILED DESCRIPTION OF PREFERRED EMBODIMENTS

Central to the invention is the use of a high pressure plasma (HPP) to promote endothermic chemical reactions. A plasma is defined as an approximately neutral cloud of charged particles which can be formed, for example, by an electric glow discharge in a strong electric field. A high pressure plasma is one formed at a pressure in excess of about 100 torr (about $1.3 \times 10^4$ Pa). For practical purposes, the high pressure plasma of interest is typically produced at pressures of about one atmosphere. An important characteristic of the high pressure plasma, in contrast to a low pressure plasma, is the thermal equilibrium which exists between electron and gas temperatures; the gas temperature in a high pressure plasma can typically reach 3000°–5000° K. This high gas temperature promotes endothermic reactions in accordance with the invention and leads to high throughput and efficiency.

An apparatus and process for carrying out high pressure plasma reactions are described more fully in copending applications Ser. Nos. 184,095 and 184,094, the contents of which are herein incorporated by reference. In general, a silicon-bearing reactant gas and hydrogen are conveyed separately to a high pressure plasma nozzle where the two react in the presence of and are influenced by the high temperature of the high pressure plasma.

Figure 1:
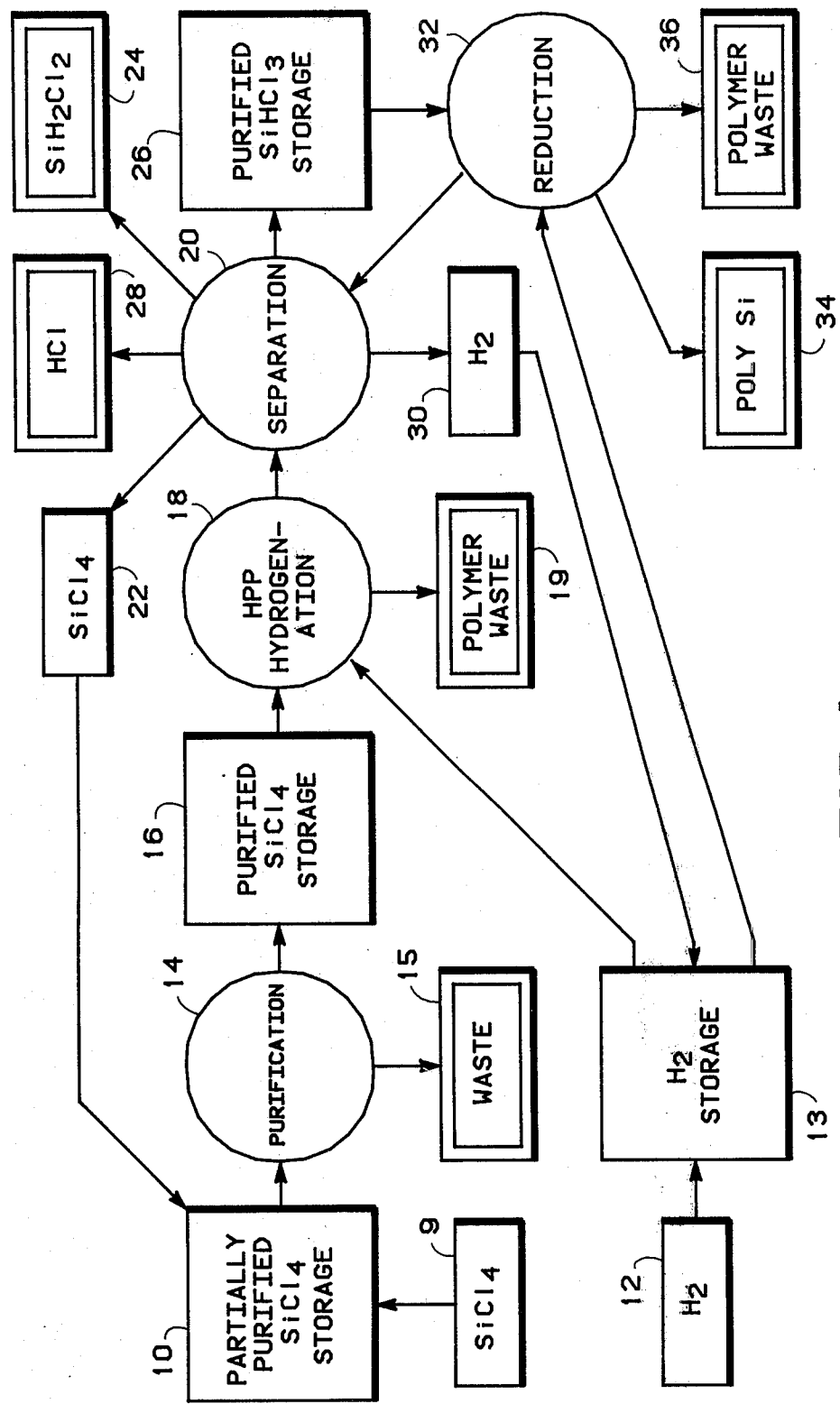
FIGS. 1-3 are flow diagrams illustrating three separate embodiments of the invention.

FIG. 1 illustrates a first embodiment of the invention. Silicon tetrachloride 9 and hydrogen 12 are introduced to the system. If introduced in only a partially purified form, the SiCl₄ is stored 10 in this form and then undergoes purification 14, for example, by distillation. Waste products 15 from the distillation are discarded. The purified SiCl₄ is placed in storage 16.

The purified SiCl₄ and the H₂ are combined in the presence of a high pressure plasma to accomplish high pressure plasma hydrogenation 18 of the silicon tetrachloride according to the reaction

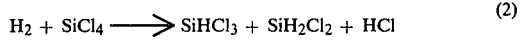

$$H_2 + SiCl_4 \longrightarrow SiHCl_3 + SiH_2Cl_2 + HCl \qquad (2)$$

By this reaction, SiCl₄ is hydrogenated to produce SiHCl₃, which is readily usable in the conventional polycrystalline silicon deposition process. During the hydrogenation step, the mole ratio of H₂ to SiCl₄ is preferably maintained in the range of 4 to 5 to maximize production of trichlorosilane without the deposition of silicon. During the hydrogenation, small but relatively insignificant amounts of polymeric silanes are produced. This polymer waste 19 is discarded.

The effluent from the high pressure plasma hydrogenation step which includes SiHCl₃, SiH₂Cl₂, HCl, as well as unreacted H₂ and SiCl₄, is separated 20 into individual constituents. The silicon-bearing compounds are separated, for example, by freezing from the effluent mixture at a temperature of about −78° C. The individual silicon-bearing compounds are then separated by distillation. SiCl₄ 22 is recycled to the partially purified SiCl₄ storage 10. The small amount of SiH₂Cl₂ 24 produced by the hydrogenation reaction is a waste product for this reaction, but in fact is a valuable compound, useful, for example, in the epitaxial deposition of silicon. The SiHCl₃ produced in the reaction is placed in purified SiHCl₃ storage 26. The H₂ and HCl which pass through the low temperature condensation step are readily separated in a carbon adsorption bed. The HCl 28 is absorbed by the bed and later discarded. H₂ 30 passes through the bed and is recycled as H₂ starting material 12.

The purified SiHCl₃ produced by the hydrogenation reaction is reduced with hydrogen in a reduction reaction 32. The reduction reaction is alternatively the conventional hydrogen reduction of trichlorosilane at a heated filament or a high pressure plasma reduction as described below. The results of the reduction reaction are deposits of the desired pure polycrystalline silicon 34, some small amount of polymeric waste 36, and a reaction effluent including silicon-bearing gases, hydrogen and hydrogen chloride, all of which are routed back to the separation step 20 for cyclic reuse.

The above-described embodiment provides a method for depositing polycrystalline silicon wherein relatively inexpensive SiCl₄ is substituted as a starting material for the normally used and more expensive SiHCl₃. Silicon bearing reaction products and hydrogen are recycled in the process.

Figure 2:
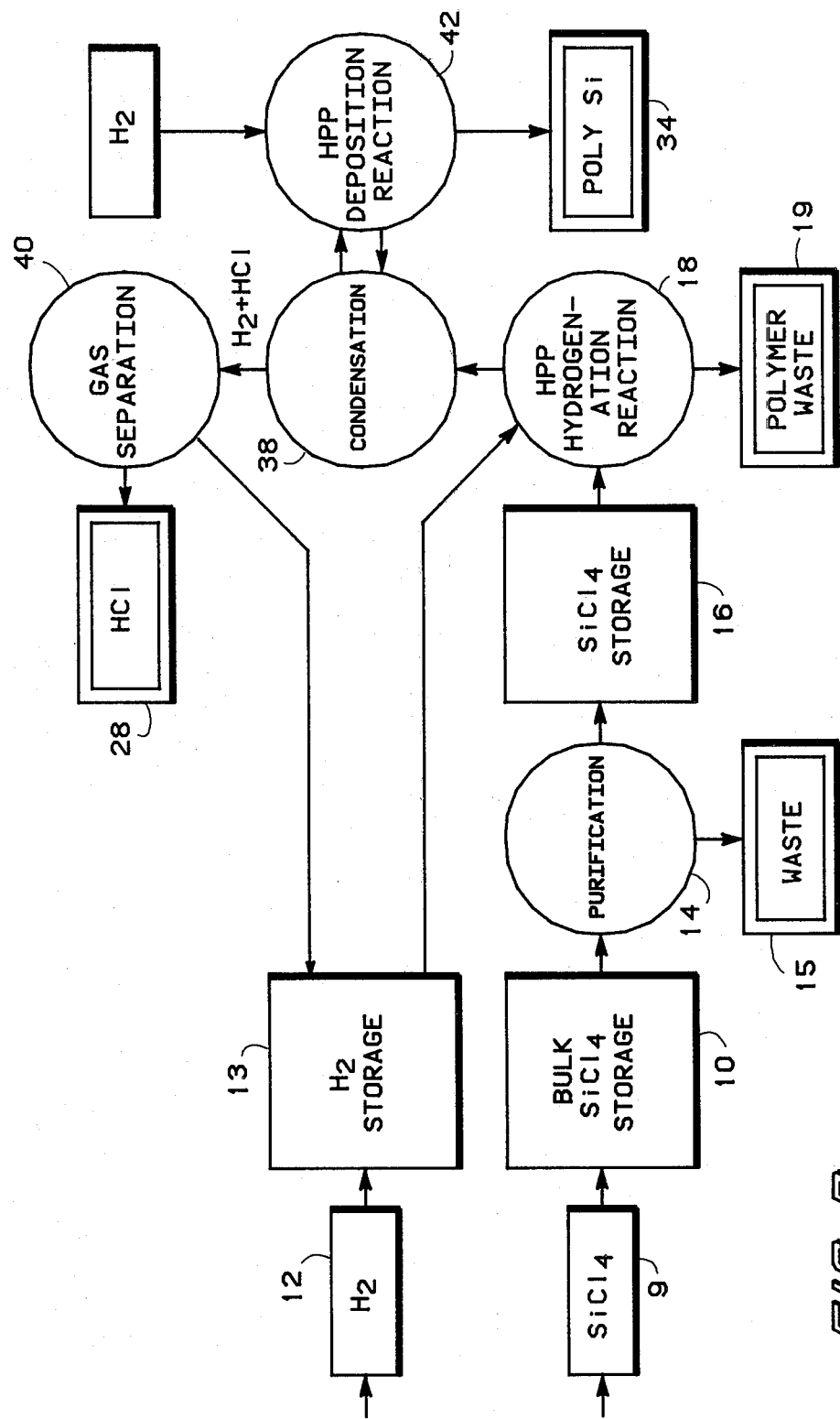

FIG. 2 is a flow chart illustrating a further embodiment of the invention. As with the above embodiment, the material inputs to the process are hydrogen 12 and silicon tetrachloride 9. Storage is provided for the partially purified or bulk SiCl₄ and for the hydrogen. The silicon tetrachloride is purified 14 and stored 16. Waste products removed by the purification are discarded 15. The hydrogen and purified SiCl₄ are conveyed to the high pressure plasma hydrogenation reactor 18 where the SiCl₄ is hydrogenated.

The effluent from this hydrogenation reaction includes SiCl₄, SiHCl₃, SiH₂Cl₂, H₂, and HCl. The effluent is separated by condensation at a reduced temperature to separate the silicon-bearing components from the other constituents. The HCl and H₂ are separated by standard carbon adsorption techniques 40. The HCl is discarded from this reaction and the H₂ is recycled to H₂ storage 13.

The silicon-bearing constituents removed by condensation 38 are taken as a whole, without separation, and together with hydrogen from the hydrogen storage are cycled through a second high pressure plasma reactor 42 optimized for silicon deposition. For this the ratio of chlorine to hydrogen in the input gas stream is maintained at a value of about 0.1.

Deposition of polycrystalline silicon takes place on a heated substrate within the reactor. The substrate is heated to a temperature in excess of about 950° C. and preferably to about 1100° C. to obtain a uniform dense deposit. The substrate can be of any desired shape and size to provide a polycrystalline silicon deposition in the shape of rod, sheet, or the like. Preferably the substrate is a material such as molybdenum or tungsten which has an appreciably different thermal coefficient of expansion than does the silicon. With such a substrate the silicon deposit is easily removed from the substrate by thermal expansion shear stress.

The effluent from this second high pressure plasma reactor is likewise recycled through condensation step 38. The efficiencies achieved through this embodiment, including the utilization of all silicon compounds from the effluent, are more fully discussed below.

Figure 3:
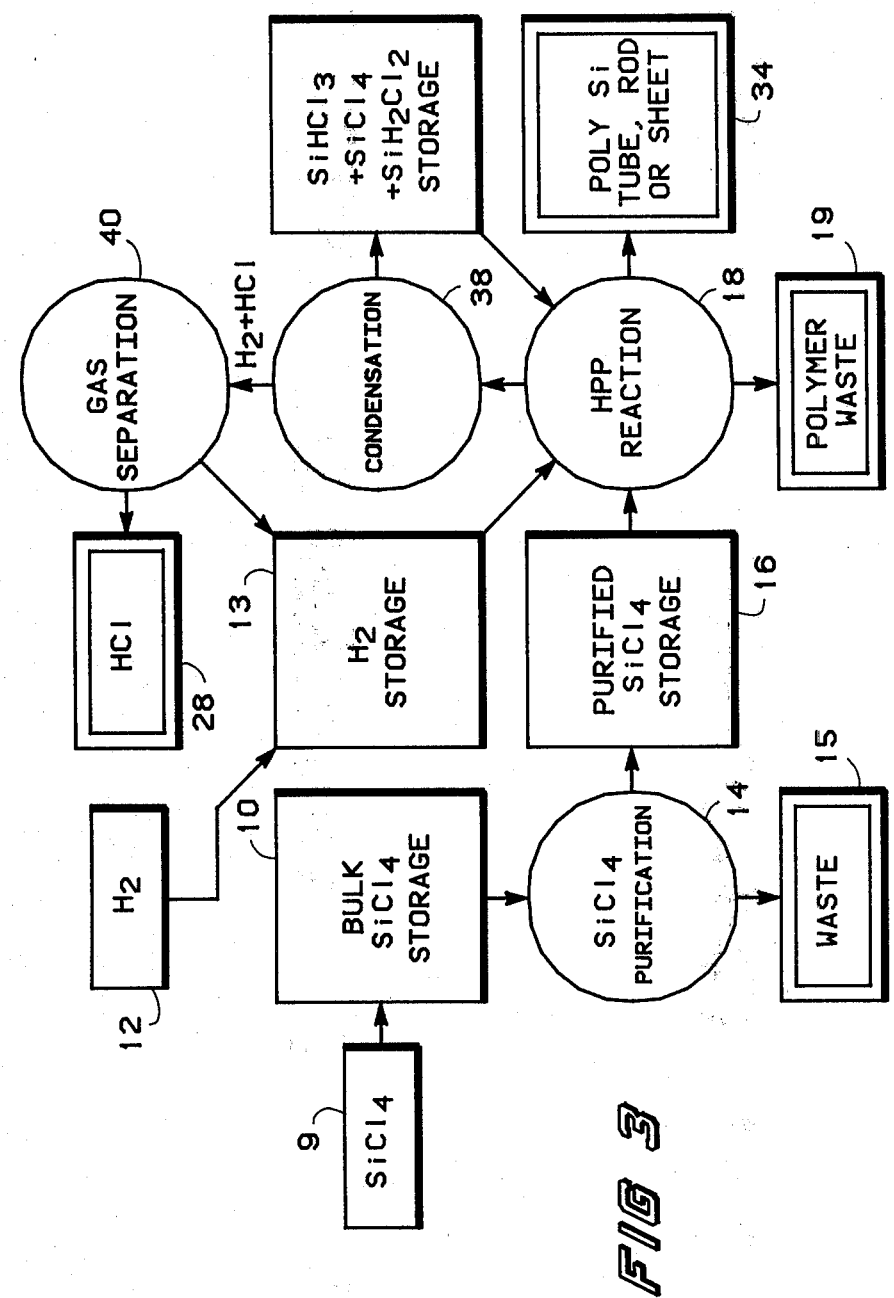

FIG. 3 is a flow chart illustrating a still further embodiment of the invention. The first part of the flow chart is similar to that shown in FIG. 2. Inputs to high pressure plasma reaction 18 are from H₂ storage 13 and purified SiCl₄ storage 16. In this embodiment, high pressure plasma reactor 18 serves to accomplish both the initial hydrogenation of silicon tetrachloride and the reduction of silicon bearing gases for the deposition of polycrystalline silicon. The hydrogen and silicon tetrachloride are reacted in the presence of a high pressure plasma to deposit silicon on a heated substrate provided within the reactor apparatus. The effluent from the reaction is condensed in a condensation step 38 at a temperature of about −78° C. All silicon-bearing components in the effluent are effectively condensed at this temperature. HCl and H₂ also contained in the effluent pass through the condensation step to the gas separation step 40. From there the hydrogen is recycled as before. The condensed silicon-bearing components as a whole, with additional amounts of hydrogen added, are recycled through the same high pressure plasma reactor after adding makeup amounts of silicon tetrachloride.

For a silicon deposition temperature of about 1100° C., a pressure of about one atmosphere, and a ratio of chlorine to hydrogen in the input gas stream of about 0.1 (equivalent to a H₂/SiCl₄ ratio of 20 in the input gas stream), the distribution of silicon-bearing constituents in the exhaust gas stream exiting the high pressure plasma reactor is about: 43% SiCl₄, 56% SiHCl₃, and 1% SiH₂Cl₂. The silicon to chlorine ratio of this gas mixture is about 0.29. The silicon to chlorine ratio in the input gas stream determines the deposition efficiency; the higher the ratio, the higher will be the deposition efficiency. The deposition efficiency obtained by using the above exhaust gas mixture as the silicon source input to the high pressure plasma reactor is thus higher than when using $SiCl_4$ alone (Si/Cl=0.25) and approaches that when using $SiHCl_3$ (Si/Cl=0.33). Separation of the individual silicon-bearing constituents by fractional distillation is thus not necessary. Each of the silicon-bearing constituents contributes to the silicon deposition reaction. Even the normally waste $SiCl_4$ adds to the efficiency of the reaction.

In the embodiment shown in FIG. 3, initially $SiCl_4$ will be used as silicon source gas in the HPP reaction. The by-product chlorosilanes ($SiCl_4$, $SiHCl_3$ and $SiH_2Cl_2$) are stored in storage tanks after separation from the HCl and $H_2$. After collecting a quantity of this chlorosilane mixture, the mixture is used as the main silicon source gas for the HPP reaction with some makeup $SiCl_4$ added. Thus the chlorosilane mixture storage tanks alternatively serve as collection tanks (for effluent chlorosilanes) and feed tanks (for HPP reaction). When the input rate of this chlorosilane mixture into the HPP reactor is the same as its production rate from the HPP reactor, there is no accumulation and the system is balanced. The makeup $SiCl_4$ accounts for the silicon solid being formed. The input rate of makeup $SiCl_4$ in moles per minute is the same as the deposition rate of silicon in moles per minute. The Cl/H ratio in the total input gas mixture to the reactor is maintained at 0.1 to obtain optimum per pass conversion efficiency and optimum silicon throughput. Although the input silicon source is $SiCl_4$ the cyclic process results in a conversion efficiency higher than that possible in a process which deposits directly from $SiCl_4$.

The embodiments presented are illustrative of the invention wherein polycrystalline silicon is produced by an efficient process; byproducts of the various reactions are recycled to optimize utilization of input materials. The initial portion of the process can be further integrated to make even further use of the reaction byproducts.

Figures 4, 5:
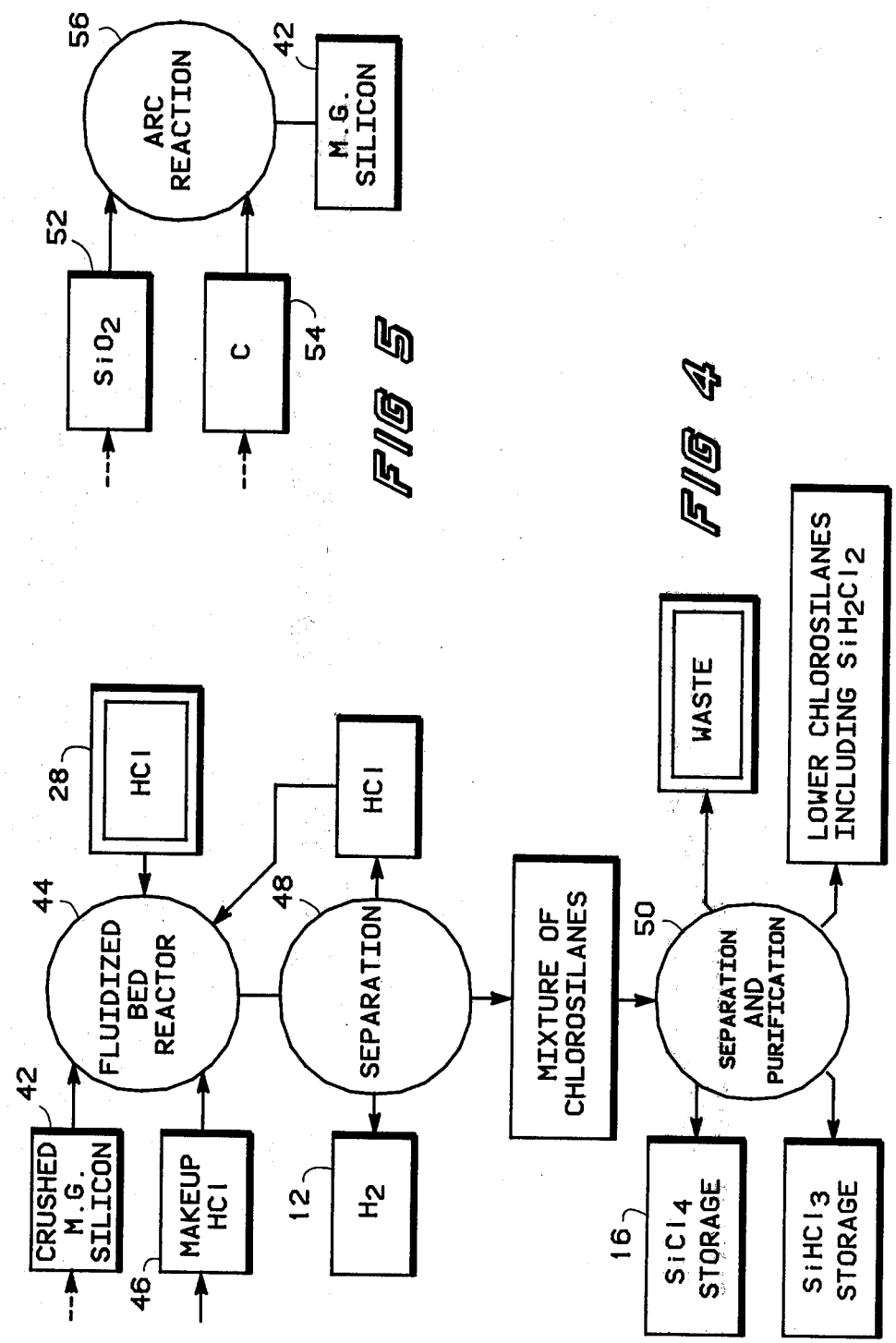
FIGS. 4 and 5 are flow diagrams illustrating embodiments for further integrating the front end of the process of the invention.

FIG. 4 illustrates one embodiment by which the front end of the process can be further integrated. In this embodiment HCl produced by the hydrogenation or deposition reaction is utilized in a process for the production of the $SiCl_4$ utilized as the silicon source. Crushed metallurgical grade silicon 42 is reacted with HCl in a fluidized bed reactor 44. To the extent available, HCl 28 produced by the above discussed reactions is used as part of the HCl input. Additional makeup HCl 46 may also be required. The products resulting from the fluidized bed reaction include hydrogen which is utilized in the input of the silicon deposition reaction, HCl, and various chlorosilanes. The chlorosilanes are separated and purified 50 and then stored in appropriate storage tanks for subsequent use in the HPP deposition reaction. The HCl is recycled and used in the fluidized bed reaction.

In still another embodiment the process is further integrated to produce metallurgical grade silicon as illustrated in FIG. 5. In this embodiment, $SiO_2$ 52 and carbon 54 are combined in an arc reaction 56 to produce metallurgical grade silicon 42. This process is thus the front end of the process described in FIG. 4.

Thus it is apparent that there has been provided, in accordance with the invention, an improved process for the deposition of polycrystalline silicon which is efficient in the use of both energy and reactants. Depending upon the degree of integration of the front end portion, the process is a balanced system requiring as raw materials only metallurgical grade silicon or quartz and carbon and makeup amounts of hydrogen and hydrogen chloride. There are no wasted byproducts. Byproducts of the deposition reaction are recycled to provide optimum usage of the chemical inputs.

We claim:

1. A process for producing polycrystalline silicon which comprises the steps of: in a first high pressure plasma reactor reacting hydrogen with silicon tetrachloride in a high pressure plasma hydrogenation reaction at a pressure of about one atmosphere, the effluent from said reaction including silicon bearing compounds including silicon tetrachloride, trichlorosilane, and dichlorosilane; separating said silicon bearing compounds from said effluent; and in a second high pressure plasma reactor reducing said silicon bearing compounds with hydrogen on a heated substrate in a high pressure plasma reaction at a pressure of about one atmosphere to deposit silicon on said heated substrate.

2. The process of claim 1 wherein said step of reducing to deposit silicon results in a further effluent, the process further comprising the step of introducing said further effluent to said step of separating.

3. The process of claim 1 further comprising the step of separating said silicon from said substrate.

4. The process of claim 1 wherein said substrate is heated to a temperature in excess of 950° C.

5. The process of claim 4 wherein said substrate is heated to a temperature of about 1100° C.

6. The process of claim 1 wherein said chlorosilanes are separated by freezing from said effluent.

7. The process of claim 6 further comprising the step of separating the hydrogen and HCl in the remaining effluent by using a carbon adsorption column.

8. The process of claim 7 further comprising the step of introducing into said steps of reacting and reducing said hydrogen separated from said remaining effluent.

* * * * *